United States Patent [19]

Horsley et al.

[11] Patent Number: 4,688,588
[45] Date of Patent: Aug. 25, 1987

[54] SLURRY VISCOSITY CONTROL

[75] Inventors: Richard R. Horsley, Ferndale, Australia; Robert L. Jones, Halfway House, South Africa; Robert J. Snow, Ferntree Gully, Australia

[73] Assignees: Royal Melbourne Institute of Technology Limited, Melbourne; Western Australian Institute of Technology, both of Western Australia, Australia

[21] Appl. No.: 844,180
[22] PCT Filed: Jun. 24, 1985
[86] PCT No.: PCT/AU85/00138
  § 371 Date: Feb. 24, 1986
  § 102(e) Date: Feb. 24, 1986
[87] PCT Pub. No.: WO86/00385
  PCT Pub. Date: Jan. 16, 1986

[30] Foreign Application Priority Data
  Jun. 22, 1984 [AU] Australia .............. PG5636

[51] Int. Cl.$^4$ .............................. F17D 1/16
[52] U.S. Cl. ...................... 137/13; 406/197
[58] Field of Search ............... 137/13; 406/10, 197; 44/51

[56] References Cited

U.S. PATENT DOCUMENTS 4,522,628  6/1985  Savins ........................ 137/13 X
4,526,584  7/1985  Funk .......................... 137/13 X
4,605,329  8/1986  Duffy ......................... 137/13 X

FOREIGN PATENT DOCUMENTS 9021082  11/1982  Australia .

Primary Examiner—Alan Cohan
Attorney, Agent, or Firm—Ladas & Parry

[57] ABSTRACT

A method for facilitating the flow of material in fines. The fines are selected from silica based materials and coals; and the level of impurity in the fines and comprising metal oxide, carbonate and sulphides in the case of silica materials, and coal ash in the case of coals, is determined. A thick slurry of the fines in water is prepared, and a quantity of dispersant proportional to the determined level of impurity is added to the slurry to form a pumpable slurry.

11 Claims, 8 Drawing Figures

FIG 1—RHEOGRAMS OF 2-12% $Fe_2O_3/SiO_2$ SLURRY WITHOUT ADDITIVES

FIG 2 – RHEOGRAMS OF 12% $Fe_2O_3/SiO_2$ SLURRY WITH INCREASING AMOUNTS OF $Na_5P_3O_{10}$

FIG 4 — ZETA POTENTIALS OF A 5% BY WEIGHT $Fe_2O_3$ SLURRY WITH INCREASING AMOUNTS OF $Na_5P_3O_{10}$

SLURRY VISCOSITY CONTROL

This invention relates to an improved means of controlling the viscosity of slurries.

Solid in liquid dispersions in which the solid particles usually exceed colloidal dimensions are referred to as suspension concentrates and have been the subject of an extensive review [TADROS Th. F "Physical Stability of Suspension Concentrates", Advanced Colloid Interfaced Science, Vol. 12, p 141, (1980)]. In this review, the author deals mainly with pharmaceutical and pesticidal preparations, but mentions a number of other industrial applications such as paints, dye-stuffs, pigments, paper coatings and printing inks. The main distinction between suspension conecentrates and colloidal dispersions is that the particles in the former tend to settle to the bottom of a container, whereas in the latter the particles are kept dispersed by a mild mixing produced by ambient thermal fluctuations and/or Brownian motion. This settling out tendency, together with the general flow properties, is a cause of major concern to those involved with such coarse suspension concentrates, particularly at higher concentrations.

Another major industrial application of coarse suspension concentrate technology is in mining operations, including operations applicable to the disposal of waste products or tailings. These operations frequently entail the handling, as slurries, of fine powders composed largely of silica and other components. These other components obviously depend on the particular mining operation, but usually include ferric oxide, alumina and, to a lesser extent, other metallic oxides. The handling of such products, particularly in the case of waste products, is usually effected by mechanical pumping of the materials mixed with water as a thick slurry, and transporting by pipeline to processing plant, settling ponds or worked out areas of the mine. The efficiency of the handling will in such case depend on pumping power requirements, which will in turn depend on the concentration, viscosity and yield stress of the slurry.

It is known that the flow of material in the form of suitable fine solids (generally referred to as "fines") may be facilitated by mixing the fines with water, or adjusting the fines/water ratio, and adding an inorganic dispersant to form a flowable slurry. It has been shown that flowable slurries can be so obtained with a water and fines mixture containing between 55 to 70% by weight of fines and 0.1 to 0.25% by weight of inorganic dispersant, such as a sodium phosphate (orthophosphate, pyrophosphate, hexametaphosphate or tripolyphosphate).

Attainment of a flowable slurry can greatly facilitate the handling of fines in many applications such, as indicated, in the mineral processing industry. However, the power requirements in pumping slurries through pipelines are critical in terms of pumping efficiency, and more importantly, overall cost-benefit considerations. In many instances, particularly those involving disposal of mine tailings, the economics are quite marginal and economically viable operation is possible only if power requirements and the cost of dispersant can be minimised. That is, the level of dispersant used to achieve a flowable slurry must be such that the flow characteristics of the slurry permit the efficient pumping at an aggregate cost for power and dispersant which enables economically viable operation. Even at levels of 0.1 to 0.25% by weight of a sodium phosphate dispersant, costing from $1,500 to $2,000 Australian per tonne, such operation can be rendered uneconomic.

It has now been discovered, by conducting rheological measurements on concentrated silica slurries in which are present increasing amounts of inorganic oxide, hereinafter referred to as "impurity"or "impurities", that viscosity increases markedly when only small amounts of certain impurities (up to 10% by mass of total silica) are present in the slurry. In addition to this viscosity increase, the departure from Newtonian behaviour is also increased, whereas pure siliceous slurries closely approximate Newtonian behaviour. Further, the settling rate of slurry particles decreases as the impurity content is increased. Certain soluble inorganic and organic additives can negate the effects of these impurities, causing a substantially instantaneous decrease in the yield stress and viscosity of the slurry, promoting a return towards Newtonian behaviour.

It has been found that, with siliceous slurries that increase in viscosity and departure from Newtonian behaviour is most marked with oxides, carbonates and sulphides of iron, in particular ferric oxide. while impurities comprising oxides, carbonates and sulphides of nickel, manganese and zirconium also have an appreciable effect. To a lesser degree, impurities comprising alumina and the oxides, carbonates and sulphides of titanium and chromium also have an effect. Additionally, it has been found that determining the content of such impurity or impurities for a given slurry enables addition of an inorganic or organic dispersant substantially in proportion to the level of the impurity or aggregate of impurities; the resultant slurry being able to be pumped efficiently at an economically viable aggregate cost for power and dispersant.

The dispersant may be a sodium phosphate. Sodium tripolyphosphate and sodium hexametaphosphate are preferred, but sodium orthophosphate and sodium pyrophosphate can be used. The dispersant alternatively may be an organic dispersant, with naphthalene sulphonate aminoplast polymers being particularly preferred. In each case, operation according to the present invention can enable the attainment of a flowable slurry which is efficiently pumpable with low power requirements, using a quantity of dispersant from about 0.01% to about 0.05% by weight of the total slurry solids. That is, the consumption of dispersant can be reduced by a factor of about 10, compared with what previously was thought to be required.

The foregoing, discovery is found to be applicable to siliceous mineral slurries which contain such impurity or impurities. However, it further has been found to be applicable to slurries of particulate coal. Such slurries of high grade, low ash anthracite coal are similar to pure siliceous slurries in approximating Newtonian behaviour. However, increasing ash content of the slurries causes a departure from the behaviour and markedly increases the slurry viscosity. The ash is comparable in the context of coal slurries to metal impurities in siliceous slurries, but, again, these adverse effects can be negated by soluble inorganic and organic additives as discussed above. Also, this application of the invention to coal slurries can be extended to slurries of lower ranking coals, through bituminous to brown coals.

For anthracite coals, phosphate dispersants can be used, although an organic dispersant such as a naphthalene sulphonate aminoplast polymer is preferred. For lower ranking coals, it is highly desirable that such organic dispersant be used, as the phosphate dispersants can be rendered inoperative by organic constituents of the coal.

It is found that, in using an organic phosphate as dispersant for siliceous slurries, calcium and magnesium ions in the slurry interfere with the action of the dispersant. It is believed that this is due to those ions acting as phosphate scavengers, as explained below; the ions thus preventing the dispersant from achieving its desired effect. However, it is found that treatment of the slurry to precipitate calcium and magnesium ions, as insoluble salts, prior to the addition of an inorganic phosphate dispersant, overcomes this problem. Such dispersant then may be added with full beneficial results, as detailed in the preceding pargraphs.

The foregoing aspects of the invention have important applications in the handling or disposal of products or residue from, for example, many mining operations. These products, as well as residues commonly referred to as "tailings", are composed largely of silica with varying amounts of other materials, the most common of these being various metallic oxides, carbonates and sulphides, particularly ferric oxide and alumina, but also including the oxides, carbonates and sulphides of zinc, tin, manganese, zirconium, titanium, cobalt, nickel, chromium, copper and cadmium. Other impurities include clays in the form of aluminosilicates.

The products or tailings frequently need to be in the form of thick slurries in order that they are able to be transported through pipelines. The power requirements for pumping these slurries depends, as indicated, on the chemical compositions of the slurry and, to a lesser degree, on the size spectrum of the solids. However, the power requirement generally increases as the amount of impurity, particularly ferric oxide, increases. The characteristics of the slurry can be altered in a practical way by the addition of appropriate additives, in particular a sodium phosphate or a naphthalene sulphonate aminoplast polymer.

Rheological measurements on concentrated silica slurries has facilitated the determination of power requirements for pumping silica base slurries containing impurities. It is found that these requirements are directly applicable to pumping silica base slurries containing similar impurities, but based on mining products or tailings as detailed above, while similar results are achievable with other silica based slurries, for example those of silt, beach and river sands and cement/silica mixes. Additionally, it is found that those requirements are directly applicable to coal slurries, although the impurities in this instance principally comprise ash rather than metal oxides, carbonates and sulphides.

Thus, according to the invention, there is provided a method for facilitating the flow of material in the form of fines, said fines being selected from silica based materials and coals; wherein the level of impurity, comprising metal oxide, carbonate and sulphide in the case of silica materials and coal ash in the case of coal, is determined; a thick slurry of said fines in water is prepared; and a quantity of dispersant proportional to the determined level of said impurity is added to form a pumpable said slurry.

The dispersant preferably is selected from inorganic phosphates and organic naphthalene sulphonate aminoplast polymers. Most preferably the dispersant is added in a quantity of from 0.01 to 0.05% by weight based on the weight of said fines in the slurry. In the case of silica based fines, the dispersant most preferably is sodium tripolyphosphate, sodium hexametaphosphate or a said organic naphthalene sulphonate aminoplast polymer. In the case of coal fines, the dispersant most preferably is a said polymer.

The thick slurry may be prepared by adding water to the fines. Alternatively, it may be prepared by adjusting the water level of a fines/water mix. In the latter case, the adjustment may comprise dewatering where the mix contains more water then required. The thick slurry depending on its composition and size spectrum of the fines, may have from 55 to 80% by weight of fines. Preferably the slurry has from 65 to 80%, most preferably from 70 to 75%, by weight of fines.

In the case of silica based fines, the metal oxides, carbonates and sulphides of which the impurity level is to be determined are those of iron, aluminium, nickel, manganese, zirconium, titanium, and chromium. If such fines also include soluble salts of calcium and magnesium, and an inorganic phosphate dispersant is to be used, it is necessary also to determine the level of those salts and, prior to addition of that dispersant, adding a reagent which precipitates calcium and magnesium as insoluble salts. Sodium carbonate is an inexpensive reagent suitable for this purpose. Also, it is found that sodium carbonate has a synergistic effect which enhances the performance of the phosphate dispersant, such that the level of the latter can be reduced by up to 50% of that otherwise required. This synergism is such that, even if addition of sodium carbonate is not necessary to remove calcium and magnesium ions from solution in the slurry, its addition is beneficial because of its significantly lower cost than the inorganic phosphate.

For metal impurities in silica based fines up to 10% by weight of the fines, the level of dispersant required can range from 0.01% to 0.05% by weight of the fines. Addition of sodium carbonate, above any addition thereof necessary to remove calcium and magnesium ions, enables reduction of dispersant in the case of an inorganic dispersant, in substantially stoichiometric proportion.

It will be convenient to hereinafter describe the invention with particular reference to the behavioural changes as ferric oxide is introduced to pure silica slurries, although it will be appreciated that the invention has wider implications, as detailed above. Although particle size and solids concentration are the basis of the rheological properties of a slurry, the present invention has shown that the chemical composition also plays a critical role in determining such parameters as yield stress and viscosity.

Various additives have been described which decrease the yield stress and viscosity of silica based slurries, such as gold mine tailings, as considered for example Australian patent application 90210/82. It is now apparent that this phenomenon depends solely on components other than silica which occur in the tailings slurries; while in the case of coal slurries, ash level is the determinant of the phenomenon. A chemical explanation for these changes in behaviour is put forward and this may prove a useful predictive tool of considerably commercial importance.

Procedure

Pure silica, grades 100G, 200G and 300G (ACI-Tennant Pty. Ltd.) and ferric oxide (Selbys Scientific Ltd.) were obtained and used without further purification. Aluminium oxide (high purity grade alumina from Alcoa) was sieved and the fraction passing 43 um mesh was used Slurries were made up at 74% w/w concentration with distilled water at neutral pH, the solids consisting of silica-ferric oxide or silica-alumina mixtures. The iron or aluminium oxide content was varied between 2 and 13% of the total solid mass, the rest consisting of pure silica.

Similar slurries were made up with silica and titanium dioxide, chromic oxide, stannic oxide and zinc oxide.

All other chemicals used were commercially available laboratory reagent grade chemicals unless otherwise specified.

Observations where made using 100, 200 and 300G silica with and without the addition of sodium tripolyphosphate (technical grade, supplied by Ajax Chemicals).

Viscosity measurements were performed using a Haake Rotovisco RV2 viscometer with an MK 50 or MK 500 measuring head. The sensor system used as a standard MV2P rotor, but with a modified sleeve and rotating cup arrangement developed to enable the viscosity of settling slurries to be measured. This development is the subject matter of copending Australian patent application number 34156/84. The shear rate was uniformly increased and decreased using an electronic programming unit and shear stress-shear rate rheograms were plotted automatically using an X-Y recorder. All measurements were carried out at ambient temperature, $(21.0°\pm0.5°$ C.). The yield stress was taken as the intercept on the shear stress axis as the shear rate was decreased, in accordance with standard rheological practics.

Particle size analyses were carried out using a Hiac particle analyser and verified in a cyclosizer.

Zeta potential measurements were performed on a Rank Brothers Particle Microelectrophoresis Apparatus Mark II. Samples were prepared by centrifuging a 5% w/w suspension of ferric oxide in distilled water at neutral pH and using the supernatent for electrophoretic measurements. Measurements were repeated after addition of sodium tripolyphosphate in 0.1 w/w increments up to 0.5% of the total ferric oxide.

Photographs wree taken through an Olympus Optical microscope on standard black and white (Polaroid) film. For photography, example of the slurry before and after addition of additives were diluted approximately 10 fold with distilled water to enable the solid particles to be seen more closely.

Figure 1:
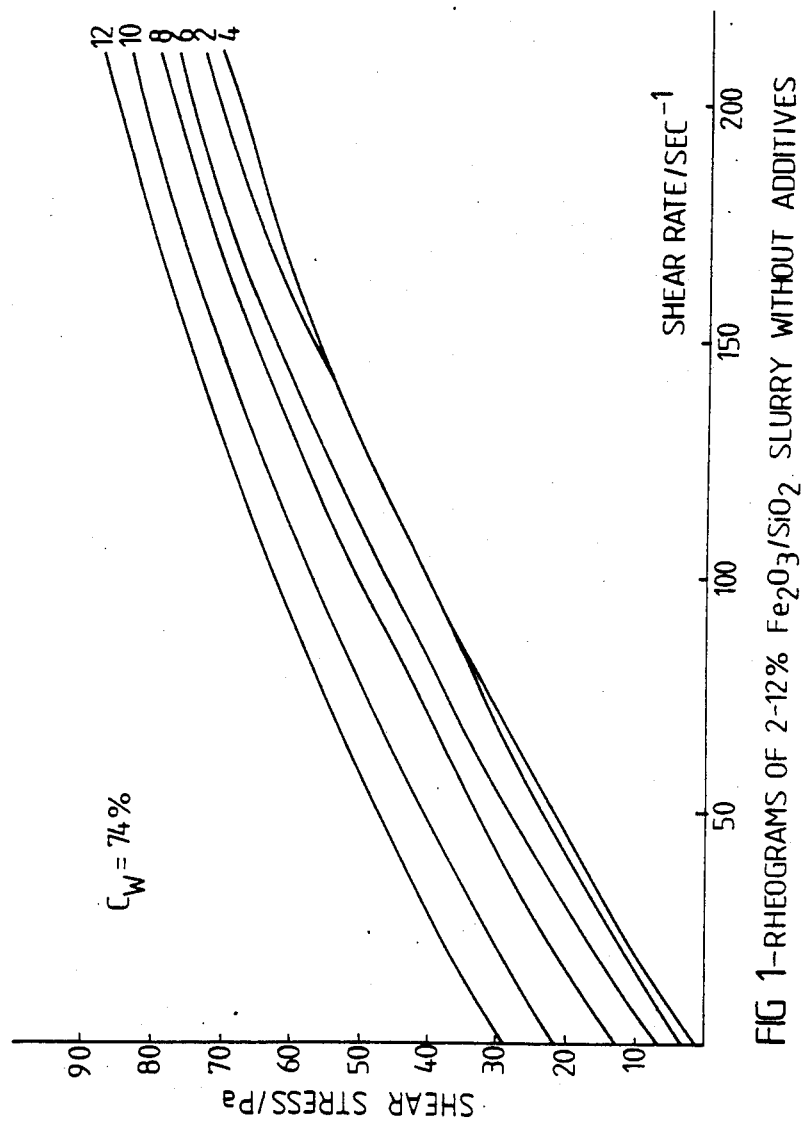
FIGS. 1 and 2 show rheograms of respective slurries tested.

Rheograms of ferric oxide - silica slurries at 74% w/w solids concentration are shown in FIG. 1. Each curve represents an average of at least four up and down runs. Rheological behaviour is typical of a non-Newtonian pseudo plastic fluid with a well defined yield point, which tends towards Newtonian behaviour at higher shear rates. Increasing amounts of ferric oxide in the mixture lead to a more pseudo plastic slurry and a higher yield stress, i.e. a great deviation from Newtonian behaviour.

Figure 2:
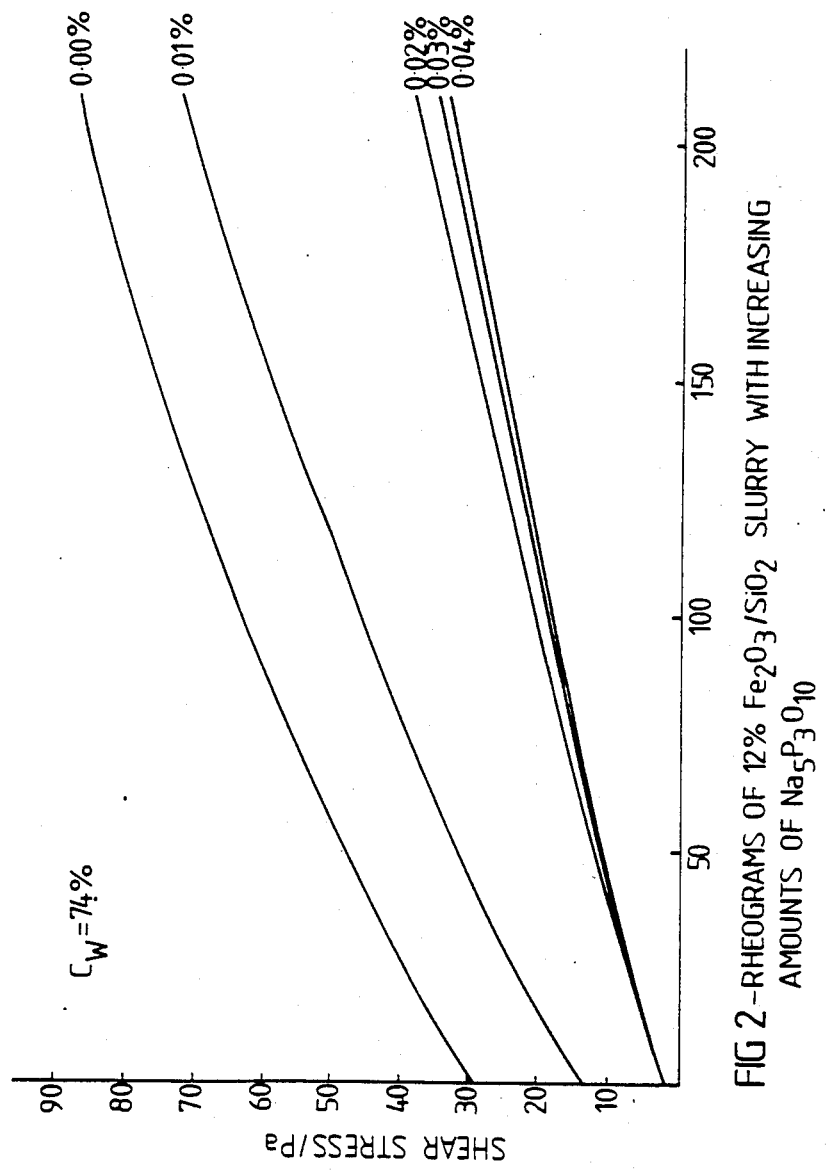

The addition of sodium tripolyphosphate causes a marked decrease in yield stress and a reduction in viscosity at low shear rates, although the apparent viscosity at high shear rates is unchanged. An example of this is shown in FIG. 2 for 12% ferric oxide. Samples at lower ferric oxide concentrations behaved similarly.

Figure 3:
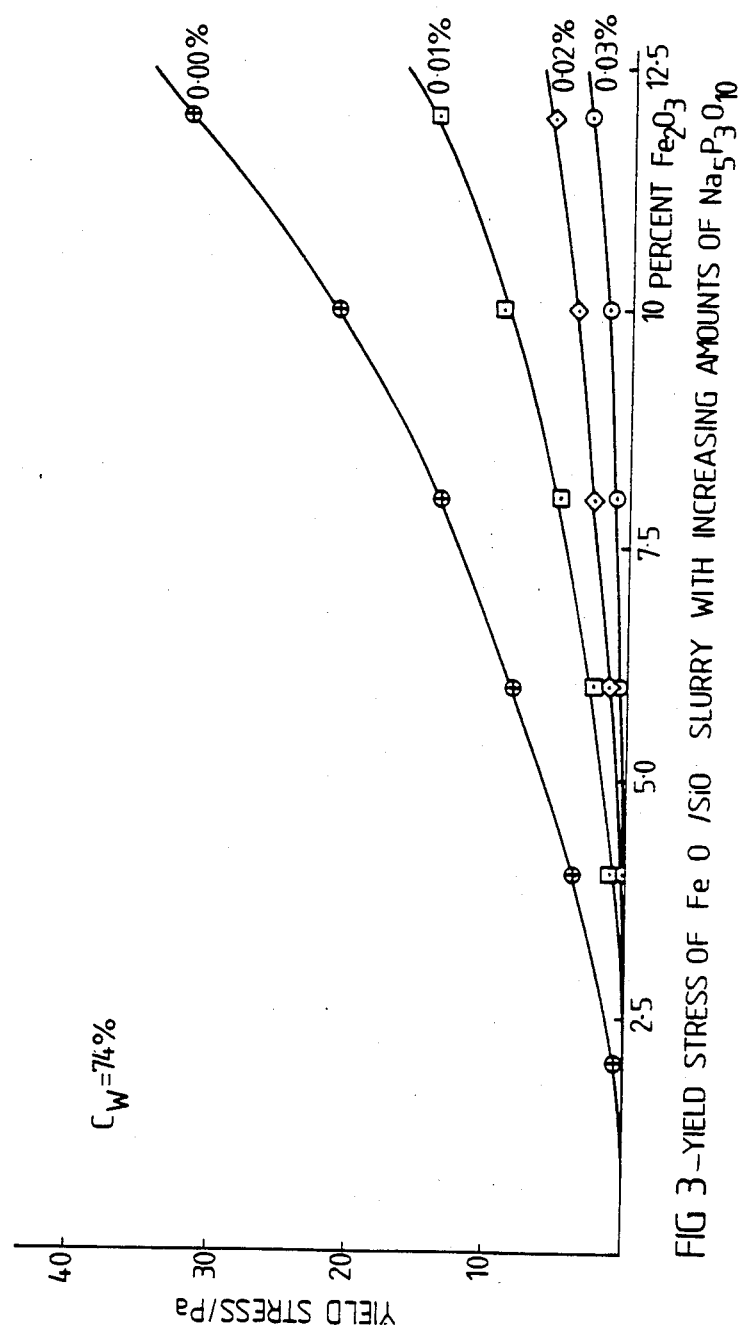
FIG. 3 shows a plot of yield stress versus dispersant addition for specific slurries.

FIG. 3 illustrates variation of yield stress with ferric oxide content, when increasing amounts of sodium tripolyphosphate are incorporated.

Figure 4:
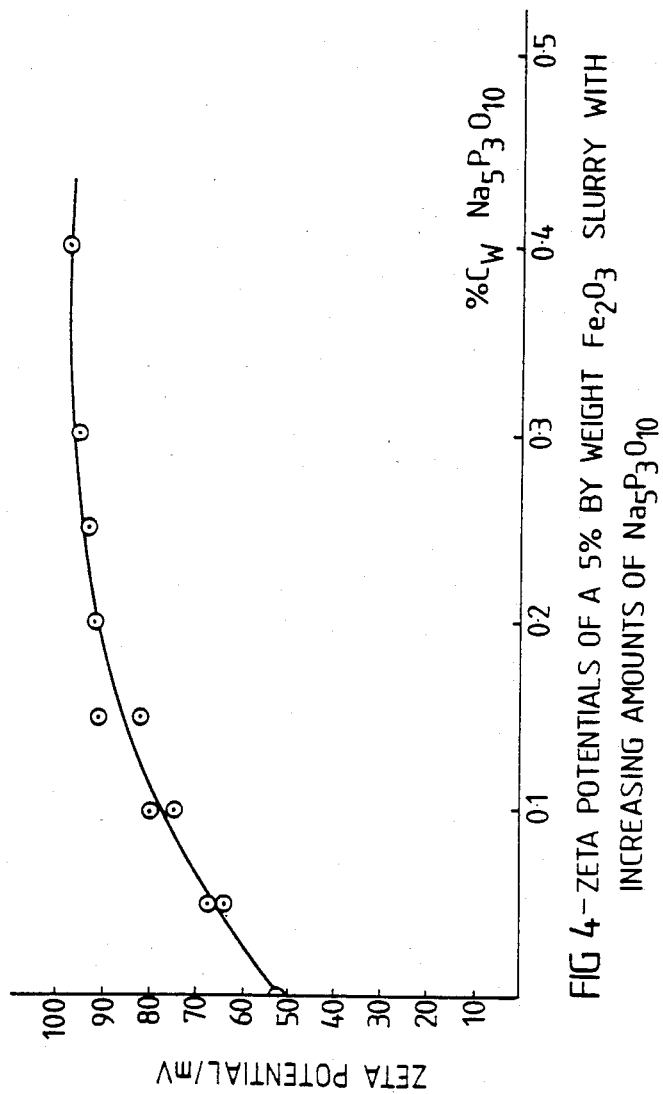
FIG. 4 shows a plot of zeta potential versus dispersant addition for a specific slurry.
Figure 5:
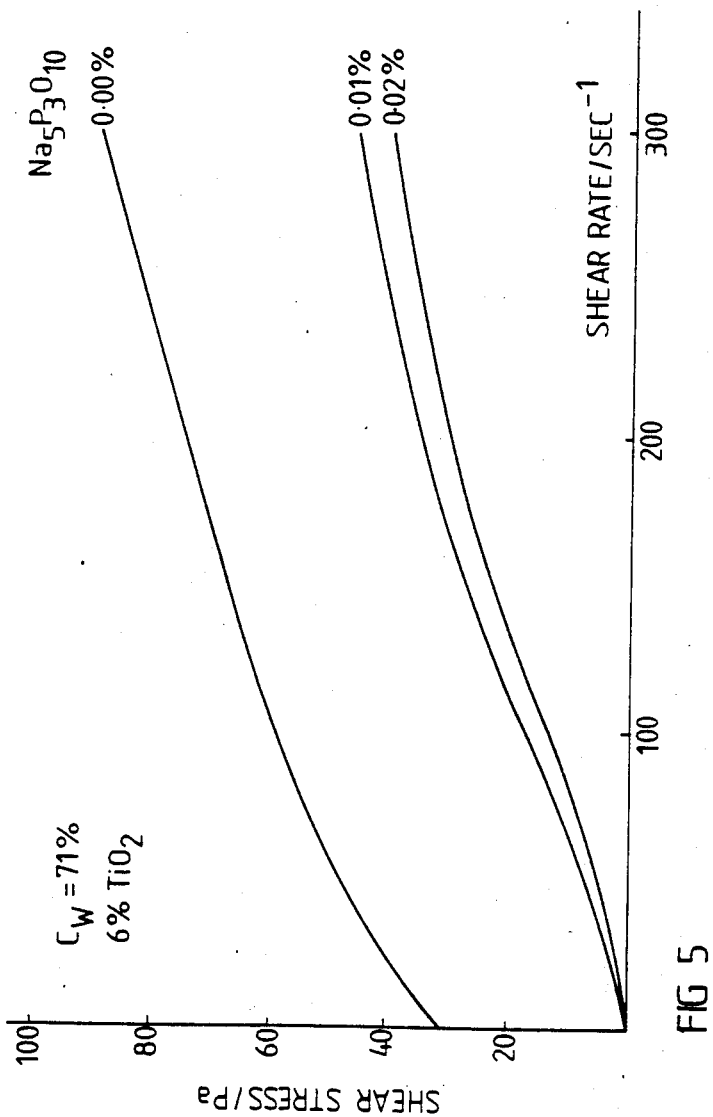
FIGS. 5 to 8 show rheograms for slurries with different impurities.

Zeta potentials of ferric oxide particles in aqueous suspension increased as the amount of sodium tripolyphosphate increased and this is shown in FIG. 4. In contrast the zeta potentials of pure silica particles did not change significantly on addition of sodium tripolyphosphate.

FIGS. 5, 6, 7 and 8 show the effect of titanium dioxide, chromic oxide, zinc oxide and stannic oxide on the rheology of silica based slurries. The effect of these oxides with increasing amounts of sodium tripolyphosphates are also incorporated.

The incorporation of small quantities of metallic oxides into aqueous silica slurries has a marked effect on flow properties leading to increased psuedo plasticity and yield stress while similar effects are achieved with metallic carbonates and sulphides instead of oxides. It can be seen from FIGS. 1, 5, 6, 7 and 8 that the rheograms are tending to become straight lines at very high shear rates, as the slurry tends towards Newtonian behaviour. The apparent viscosity at high shear rates increases as the amount of metallic oxides in the mixture decreases. On the other hand, the yield stress of the mixture decreases as the amount of ferric oxide decreases, eventually becoming zero for a silica slurry with no ferric oxide content (FIG. 3).

Addition of sodium tripolyphosphate to the slurry causes a drastic decrease in yield stress and apparent viscosity at low shear rates. At high shear rates the slope of the rheogram approximates to that prior to the addition of additive and the rheograms effectively become parallel (FIG. 2). However, much more effect is required to move the slurry prior to addition of additive, which is indicated by the higher yield stress. This effect becomes less marked as the ferric oxide content of the slurry decreases, and has almost disappeared in the 2% ferric oxide case (FIG. 1). Treatment with sodium tripolyphosphate causes the slurry mixture to tend toward Newtonian behaviour, with a viscosity which approaches that of a pure silica slurry containing the same amount of silica but no ferric oxide, i.e. a pure silica slurry of lower concentration, when subjected to high shear rates. Furthermore, the polyphosphate treated slurry on standing shows a marked tendency to settle out, forming a hard 'cake' of solid particles on the bottom of the container. The modified viscometer used in this work is essential in order to obtain meaningful and consistent results with such settling slurries.

The molecular interpretation of this behaviour is one of complex formation between the metallic ions in the metal oxide particles and water or tripolyphosphate ions. In the aggregated or flocculated state, the metallic oxide particles, which carry a slight positive charge of neutral pH, will bind water to varying degrees, and will also aggregate with the silica particles which, at neutral pH, are negatively charged. This electrostatic attraction between the small metallic oxide particles and the larger ($d_{50}=35$ μm) silica particles leads to the formation of large flocs which hold a quantity of water. This is postulated to be a two-fold retention mechanism; firstly a relatively tight binding of water molecules to the surface of the metallic oxide particles and secondly a looser binding of water within the floc network. This binding will reduce the effective volume of free water in the slurry, causing an increased resistance to flow. When subjected to increasing shearing forces, the floc structure will be broken down and the loosely held water released, thus causing a decrease in apparent viscosity which will eventually reach a constant value.

Figure 6:
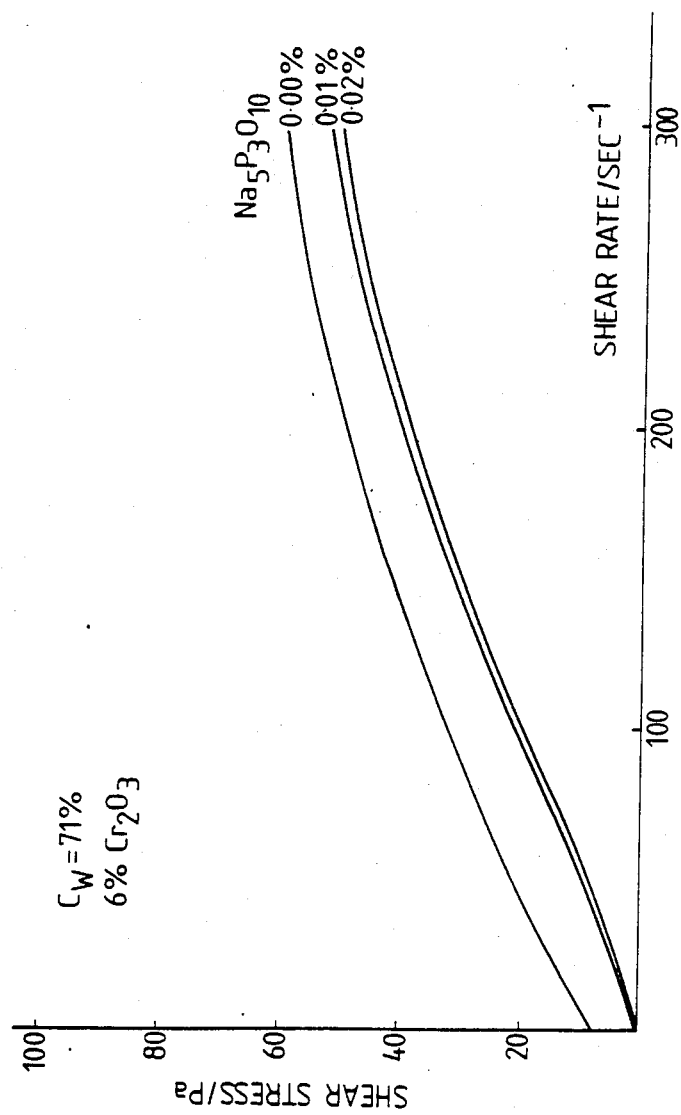
Figure 7:
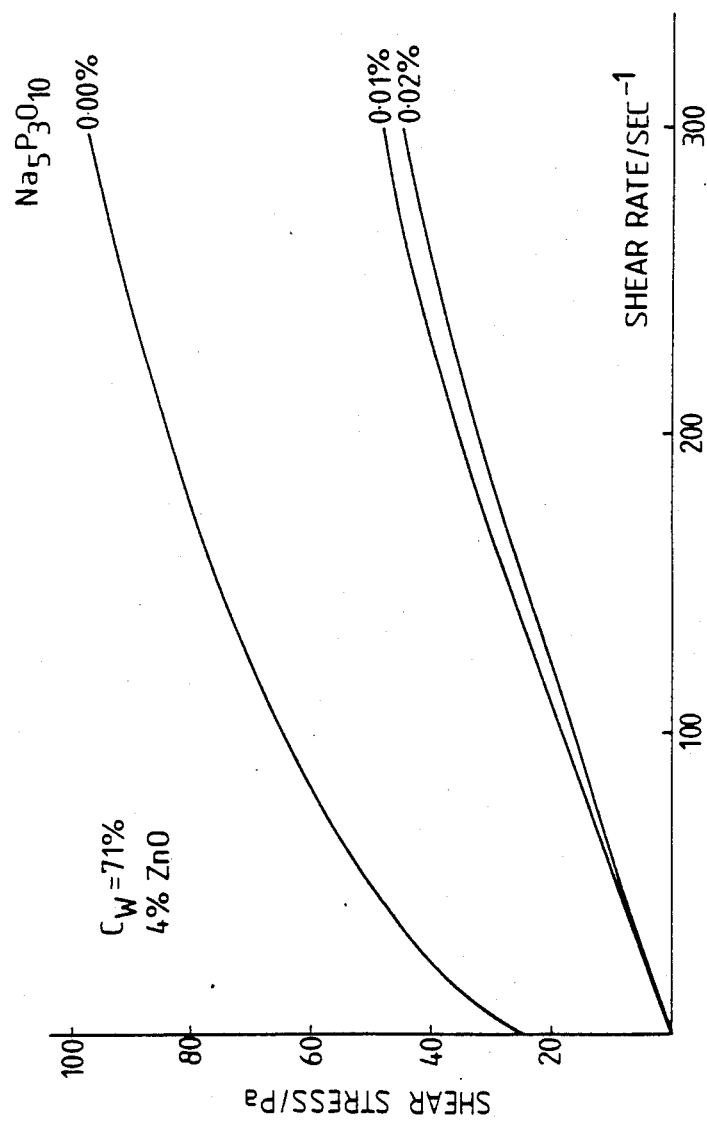
Figure 8:
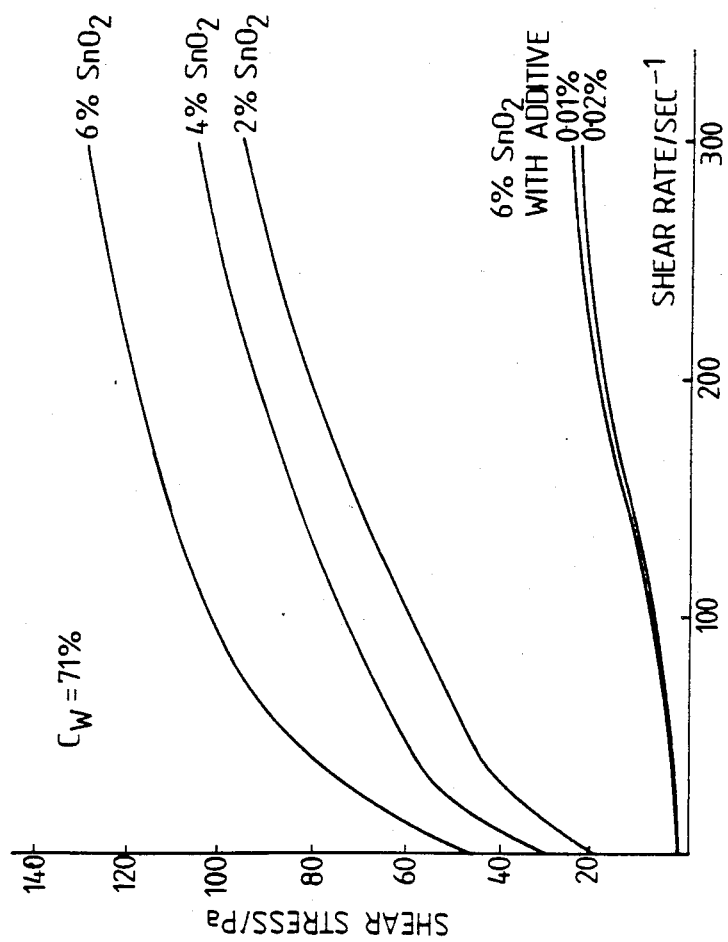

Polyphosphate ions have a strong affinity for a number of metallic ions and form very stable phosphate complexes. The degree of this affinity varies and it can be seen from FIGS. 2, 5, 7 and 8 that of the metallic oxides tested stannic ions have the strogest affinity followed by ferric, zinc, titanium in decreasing order. Chromic ions, FIG. 6, show quite a weak affinity. An explanation for this effect is briefly described below by using ferric ions as an example of the phenomena. On addition of sodium tripolyphosphate to a ferric oxide - silica slurry, tripolyphosphate ions will compete successfully with water for sites on the surface of the ferric oxide particles, releasing the bound water and creating a large negative charge on the particle surface. This in turn will create a repulsive force between the ferric oxide and silica particles, preventing any aggregation. Thus the addition of sodium tripolyphosphate not only releases surface bound water but causes the particles to repel one another and hence resistance to flow is decreased. In addition, this repulsive force enables the particles to move past each other and to form a compact layer on the bottom of the container, hence the tendency to settle out is markedly increased.

This phenomenon can actually be observed using an optical microscope, using the slurries at a suitable dilution, otherwise they become too opaque. At a magnification at 400x, the flocculated slurry (no polyphosphate) appeared as dense clusters of small, red iron oxide particles with the larger silica particles. These flocs appeared to move sluggishly when the cover slip was moved relative to the slide. In contrast, the deflocculated slurry (after addition of polyphosphate) appeared as tiny separate particles, the smaller ones in constant rapid motion and no aggregation was apparent. When the cover slip was moved in this case, the particles moved very easily over one another and the slurry appeared much more fluid.

Similar effects have been obtained with other components, namely the aforementioned sulfides, metal oxides, and clays together with certain soluble salts.

In addition it has been observed that some mine tailings, for example those containing high proportions of soluble calcium and magnesium compounds require prior treatment with sodium carbonate or other sodium compounds, before deflocculants such as the aforementioned sodium phosphates become effective. This prior treatment causes precipitations of calcium and magnesium ions as insoluble compounds and hence renders them ineffective as phosphate scavengers. Organic polysulfonates which are not usually rendered ineffective by calcium and magnesium are effective in circumstances where the phosphates may be substantially ineffective.

The foregoing experimental details as illustrated by FIGS. 1 to 8 are based on synthetic slurries; this simplifying the range of parameters to be taken into account. Also, those synthetic slurries are simply silica based, with metal oxide impurities; while sodium tripolyphosphate is the only dispersant exemplified. However, it is found that those experimental details are in good accord with similar tests conducted on silica based slurries from commercial mining operations; with the results being essentially the same regardless of whether the impurities are metal oxides, carbonates and/or sulphides. Additionally, the sodium tripolyphosphate can be substituted by another of the above mentioned sodium phosphates or a naphthalene sulphonate aminoplast polymer, at the same level, to achieve an equivalent benefit. Also, those details are in good accord with tests based on coal slurries, where the relevant impurity is coal ash rather than metal oxide, carbonate and/or sulphide and the dispersant is an naphthalene sulphonate aminoplast polymer.

The invention thus contemplates a means for readily controlling the flow characteristics of a slurry by determining the amount of dispersant required to produce a specific viscosity based on the amount and type of inorganic components comprising the slurry. A series of rheograms, in which shear stress is plotted against shear rate, can be provided. These rheograms will provide a series of curves which exhibit the effect that varying amounts and types of inorganic compounds have on the base slurry component, for example silica, and also the effect that varying percentages of flocculants have upon the slurry.

In practice an unknown slurry is chemically analysed and the amount and type of flocculent required to provide a pumpable viscosity read directly from prepared rheograms.

It will be appreciated from the foregoing that various alterations, modifications and/or additions may be incorporated into the foregoing without departing from the spirit and ambit of the invention.

The claims defining the invention are as follows:

1. A method for facilitating the flow of material in the form of fines, said fines being selected from silica based materials and coals; wherein the level of impurity in the fines and comprising metal oxide, carbonate and sulphides in the case of silica materials, and coal ash in the case of coals, is determined; a thick slurry of said fines in water is prepared; and a quantity of dispersant proportional to the determined level of impurity is added to the slurry to form a pumpalbe said slurry.

2. A method according to claim 1, wherein said dispersant is selected from inorganic sodium phosphates and naphthalene sulphonate aminoplast polymers.

3. A method according to claim 1 or claim 2, wherein said dispersant is added in an amount of from 0.01 to 0.05% by weight of said fines.

4. A method according to claim 1 or claim 2, wherein said dispersant is added in an amount of from 0.01 to 0.05% by weight of said fines for an impurity level of up to 10% by weight of said fines.

5. A method according to claim 1 or claim 2, wherein said fines comprise a silica based material containing water soluble salts of at least one of calcium and magnesium, a precipitant for calcium and magnesium ions being added to said slurry prior to said dispersant to precipitate said ions as a corresponding insoluble compound.

6. A method according to claim 5, wherein said precipitant is sodium carbonate.

7. A method according to claim 5, wherein said precipitant is added in excess of requirements to precipitate said ions and the amount of said dispersant is reduced in stoichiometric proportion to said excess by up to about 50% by weight.

8. A method according to claim 1 or claim 2, wherein said fines comprise a silica based material, sodium carbonate being added to said slurry and the amount of dispersant added to said slurry is reduced by up to about 50% by weight in stoichiometric proportion to any excess of said sodium carbonate above its level necessary to precipitate any ions of calcium and magnesium.

9. A method according to claim 1 or claim 2, wherein said fines comprise coal fines, said dispersant being a naphthalene sulphonate aminoplast polymer.

10. A method according to claim 1 or claim 2, wherein said thick slurry is prepared to achieve from 55 to 80% by weight of fines.

11. A method according to claim 10, wherein said thick slurry is prepared to achieve from 65% to 80% by weight of fines.

* * * * *